United States Patent
Galati et al.

(10) Patent No.: US 9,440,389 B2
(45) Date of Patent: Sep. 13, 2016

(54) CONTROLLED VALVE PIN MOVEMENT BASED ON CAVITY SENSOR FEEDBACK

(71) Applicant: Synventive Molding Solutions, Inc., Peabody, MA (US)

(72) Inventors: Vito Galati, Rowley, MA (US); Gregory Leon Devellian, Topsfield, MA (US); Robert William Glor, East Aurora, NY (US)

(73) Assignee: Synventive Molding Solutions, Inc., Peabody, MA (US)

( * ) Notice: Subject to any disclaimer, the term of this patent is extended or adjusted under 35 U.S.C. 154(b) by 400 days.

(21) Appl. No.: 14/243,277

(22) Filed: Apr. 2, 2014

(65) Prior Publication Data

US 2014/0210119 A1 Jul. 31, 2014

Related U.S. Application Data

(63) Continuation-in-part of application No. 13/484,336, filed on May 31, 2012, now Pat. No. 9,011,736, which is a continuation of application No. PCT/US2011/062099, filed on Nov. 23, 2011, (Continued)

(51) Int. Cl.
| | | |
|---|---|---|
| *B29C 45/76* | (2006.01) | |
| *B29C 45/27* | (2006.01) | |
| *B29C 45/28* | (2006.01) | |
| B29C 45/17 | (2006.01) | |

(52) U.S. Cl.
CPC ......... *B29C 45/762* (2013.01); *B29C 45/2703* (2013.01); *B29C 45/281* (2013.01); *B29C 2045/1792* (2013.01); *B29C 2045/2712* (2013.01); *B29C 2045/2865* (2013.01); *B29C 2045/2872* (2013.01); *B29C 2945/76076* (2013.01); *B29C 2945/76277* (2013.01); *B29C 2945/76381* (2013.01); *B29C 2945/76598* (2013.01); *B29C 2945/76755* (2013.01); *B29C 2945/76859* (2013.01); *B29C 2945/76933* (2013.01)

(58) Field of Classification Search
CPC ........... B29C 45/762; B29C 45/2703; B29C 2945/76076
See application file for complete search history.

(56) References Cited

U.S. PATENT DOCUMENTS

| | | | | |
|---|---|---|---|---|
| 5,556,582 A | * | 9/1996 | Kazmer | .............. B29C 45/0025 264/328.12 |
| 6,632,079 B1 | * | 10/2003 | Kazmer | .............. B29C 45/2701 425/145 |

(Continued)

OTHER PUBLICATIONS

Int'l. Search Report and Written Opinion mailed Jul. 23, 2014 in Int'l. Appln. No. PCT/US2014/032658.

*Primary Examiner* — James Sanders
(74) *Attorney, Agent, or Firm* — Polsinelli PC

(57) ABSTRACT

Apparatus for performing an injection molding cycle, comprising:
 a manifold routing injection fluid to two or more gates,
 an actuator associated with each gate,
 each gate having a downstream sensor that senses a selected condition of the injection fluid material,
 a controller,
 the downstream sensors establishing a standard elapsed time,
 the controller including instructions that compares the standard elapsed time with a calculated amount of elapsed time associated with each of the gates and that adjust the velocity or position of each of the actuators.

7 Claims, 4 Drawing Sheets

Related U.S. Application Data application No. 14/243,277, which is a continuation-in-part of application No. 13/484,408, filed on May 31, 2012, now Pat. No. 9,005,509, which is a continuation of application No. PCT/US2011/062096, filed on Nov. 23, 2011, application No. 14/243,277, which is a continuation-in-part of application No. PCT/US2013/075064, filed on Dec. 13, 2013, and a continuation-in-part of application No. PCT/US2014/019210, filed on Feb. 28, 2014, and a continuation-in-part of application No. PCT/US2014/031000, filed on Mar. 18, 2014.

(60) Provisional application No. 61/814,045, filed on Apr. 19, 2013, provisional application No. 61/828,454, filed on May 29, 2013, provisional application No. 61/896,313, filed on Oct. 28, 2013, provisional application No. 61/838,620, filed on Jun. 24, 2013, provisional application No. 61/827,897, filed on May 28, 2013.

(56) References Cited

U.S. PATENT DOCUMENTS

| | | |
|---|---|---|
| 2002/0086086 A1 | 7/2002 | Doyle et al. |
| 2003/0214065 A1* | 11/2003 | Doyle .................... B29C 45/27 264/40.1 |
| 2004/0047942 A1* | 3/2004 | Vasapoli ............. B29C 45/2701 425/564 |
| 2004/0166189 A1 | 8/2004 | Babin |
| 2009/0179350 A1* | 7/2009 | Bader .................... B29C 45/76 264/328.8 |
| 2011/0212204 A1 | 9/2011 | Nahill et al. |

* cited by examiner

CONTROLLED VALVE PIN MOVEMENT BASED ON CAVITY SENSOR FEEDBACK

RELATED APPLICATIONS

This application claims the benefit of priority to U.S. Provisional Application No. 61/814,045 filed Apr. 19, 2013, the disclosure of which is incorporated by reference in its entirety as if fully set forth herein.

This application claims the benefit of priority to U.S. Provisional Application No. 61/828,454 filed May 29, 2013, the disclosure of which is incorporated by reference in its entirety as if fully set forth herein This application also claims the benefit of priority to U.S. Provisional Application No. 61/896,313 filed Oct. 28, 2013, the disclosure of which is incorporated by reference in its entirety as if fully set forth herein.

This application also claims the benefit of priority to U.S. Provisional Application No. 61/838,620 filed Jun. 24, 2013, the disclosure of which is incorporated by reference in its entirety as if fully set forth herein.

This application also claims the benefit of priority to U.S. Provisional Application No. 61/827,897 filed May 28, 2013, the disclosure of which is incorporated by reference in its entirety as if fully set forth herein.

This application is also a continuation-in-part of and claims the benefit of priority to U.S. application Ser. No. 13/484,336 filed May 31, 2012 which is a continuation of PCT/US2011/062099 filed Nov. 23, 2011, the disclosures of both of the foregoing are incorporated by reference in their entirety as if fully set forth herein.

This application is also a continuation-in-part of and claims the benefit of priority to U.S. application Ser. No. 13/484,408 filed May 31, 2012 which is a continuation of PCT/US2011/062096 filed Nov. 23, 2011, the disclosures of both of the foregoing are incorporated by reference in their entirety as if fully set forth herein.

This application is also a continuation-in-part of and claims the benefit of priority to PCT/US2013/75064 filed Dec. 13, 2013, the disclosure of which is incorporated by reference in its entirety as if fully set forth herein.

This application is also a continuation-in-part of and claims the benefit of priority to PCT/US2014/19210 filed Feb. 28, 2014, the disclosure of which is incorporated by reference in its entirety as if fully set forth herein.

This application is also a continuation-in-part of and claims the benefit of priority to PCT/US2014/31000 filed Mar. 18, 2014, the disclosure of which is incorporated by reference in its entirety as if fully set forth herein.

The disclosures of all of the following are incorporated by reference in their entirety as if fully set forth herein: U.S. Pat. No. 5,894,025, U.S. Pat. No. 6,062,840, U.S. Pat. No. 6,294,122, U.S. Pat. No. 6,309,208, U.S. Pat. No. 6,287,107, U.S. Pat. No. 6,343,921, U.S. Pat. No. 6,343,922, U.S. Pat. No. 6,254,377, U.S. Pat. No. 6,261,075, U.S. Pat. No. 6,361,300 (7006), U.S. Pat. No. 6,419,870, U.S. Pat. No. 6,464,909 (7031), U.S. Pat. No. 6,599,116, U.S. Pat. No. 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068) and U.S. application Ser. No. 10/101,278 filed Mar. 19, 2002 (7070) and PCT application no. PCT/US2011/029721 filed Mar. 24, 2011 (7094), PCT publication no. WO2012074879 (A1) (7100WO0) and WO2012087491 (A1) (7100W01).

BACKGROUND OF THE INVENTION

Injection molding systems that control pin position during the course of an injection cycle have been developed where the position of the pin is dynamically controlled in real time to follow a predetermined profile of pin positions based on a comparison of the pin position with a profile of pin positions. In systems where multiple nozzles are used to simultaneously inject fluid material to either multiple separate cavities or into a single cavity, prior systems rely on a single predetermined set of pin position data to control the rate of flow of injection fluid material into each separate cavity or otherwise through each separate gate leading to a single cavity.

SUMMARY OF THE INVENTION

The present invention provides a system and method for controlling the simultaneous flow through each individual one of multiple nozzles into separate cavities or the same cavity where the rate of flow through each individual nozzle is made uniform by adjusting the flow through each of the nozzles to match as closely as possible the rate of flow or profile of pin position that occurred in a prior or test injection cycle via a selected nozzle and gate the injection part produced therefrom being selected as a standard for the rate of flow through one or more of the other multiple nozzles in subsequent injection cycles.

In accordance with the invention therefore there is provided a method of performing an injection molding cycle in an injection molding apparatus comprised of:

a manifold that receives an injection fluid material, the manifold having or communicating with a delivery channel that delivers the injection fluid mold material under an injection pressure to two or more gates each leading to an associated mold cavity, an actuator associated with each respective gate, each actuator being drivably interconnected to a valve pin drivable upstream and downstream along a path of travel having a selected stroke length that extends between a gate closed position, a selected maximum flow position at which the injection fluid material flows at a maximum rate through the gate into the cavity and one or more selectable intermediate positions between the first position and the maximum flow position, each actuator being controllably drivable to position an interconnected valve pin at the first, one or more selectable intermediate and maximum flow positions over the course of an injection cycle, a downstream sensor that senses a selected physical condition of the injection fluid material at a position within a mold cavity that is downstream of an associated gate, the downstream sensor generating a signal corresponding to the sensed values, the method comprising the steps of:

selecting and recording as a standard for a selected one of the gates, the amount of time elapsed between movement of the valve pin associated with the selected one of the gates out of the gate closed position and the time at which the downstream sensor first senses the selected condition of the injection fluid material flowing into the associated mold cavity, performing a subsequent injection cycle and for each of the other gates and sensing the selected physical condition of the injection fluid material at the downstream position with the downstream sensor associated with each of the other gates, and, recording the amount of time elapsed between movement of the valve pin associated with each of the other gates out of the gate closed position and the time at which the downstream sensor first senses the selected condition of the injection fluid material flowing into the associated cavities of each of the other gates, comparing the recorded amounts of time elapsed associated with each of the other gates with the standard amount of time elapsed that is associated with the selected one of the gates, adjusting position or velocity of the actuators or valve pins associated with each of the other gates during further subsequent injection cycles such that the amount of time elapsed between movement of the valve pins associated with each of the other gates of their gate closed position and the time at which the downstream sensor first senses the selected condition of the injection fluid material approaches or matches the selected standard amount of elapsed time.

In such a method the steps of performing and adjusting can be carried out automatically by an algorithm executed by a controller interconnected to and controllably driving or adjusting the drive of the actuators.

In such a method, the step of selecting and recording can comprise recording and establishing a standard profile of position of the actuator or valve pin versus time for the selected one of the gates and the step of adjusting can comprise recording and adjusting the position or drive rate of the actuators or valve pins associated with the other gates to approach or match the standard profile of position versus time.

In another aspect of the invention there is provided an apparatus for performing an injection molding cycle in an injection molding apparatus, the apparatus comprising:

a manifold that receives an injection fluid material, the manifold having or communicating with a delivery channel that delivers the injection fluid mold material under an injection pressure to two or more gates each leading to an associated mold cavity, an actuator associated with each respective gate, each actuator being drivably interconnected to a valve pin drivable upstream and downstream along a path of travel having a selected stroke length that extends between a gate closed position, a selected maximum flow position at which the injection fluid material flows at a maximum rate through the gate into the cavity and one or more selectable intermediate positions between the first position and the maximum flow position, each actuator being controllably drivable to position an interconnected valve pin at the first, one or more selectable intermediate and maximum flow positions over the course of an injection cycle, each gate having a downstream sensor that senses a selected condition of the injection fluid material at a position within each associated mold cavity that is downstream of each associated gate, the downstream sensor generating a response signal upon sensing the selected condition of the injection fluid material when the injection fluid material has flowed to the downstream position of the downstream sensor, a controller containing predetermined data representing as a standard for a selected one of the gates, the amount of time elapsed between movement of the valve pin associated with the selected one of the gates out of the gate closed position and the time at which the downstream sensor associated with the selected one of the gates first senses the selected condition of the injection fluid material flowing into the associated mold cavity, the downstream sensors of each of the gates other than the selected one of the gates sensing the selected condition of the injection fluid material and sending response signals to the controller on performance of each successive injection cycle by the apparatus, the controller receiving the response signals from each downstream sensor associated with the other gates on performance of each successive injection cycle performed by the apparatus, the controller including instructions that compares the amount of standard elapsed time with the calculated amount of elapsed time associated with each of the other gates, the controller including instructions that adjust the velocity or position of each of the actuators associated with each of the other gates to drive the valve pins associated with each of the other gates at one or more velocities or to one or more positions during one or more successive injection cycles based on the compared amounts of time such that the amount of time elapsed between movement of the valve pins out of the gate closed position and the time that the downstream sensors associated with the other gates first sense the selected condition approaches or matches the standard amount of elapsed time.

Such an apparatus may include position sensors that sense position of the actuator or valve pin associated with each of the gates, the controller including data representing a standard profile of position of the actuator or valve pin versus time during an injection cycle for the selected one of the gates, the controller including instructions that compares position versus time of the actuators or valve pins for each of the gates during one or more successive injection cycles with the standard profile and directs the position or velocity of the actuators or valve pins associated with the other gates during the course of the one or more successive injection cycles such that the position versus time of the actuators or valve pins associated with the other gates approaches or matches the standard profile.

In another aspect of the invention there is provided a method of performing an injection molding cycle in an injection molding apparatus comprised of:

a manifold that receives an injection fluid material, the manifold having or communicating with a delivery channel that delivers the injection fluid mold material under an injection pressure to two or more gates each leading to an associated mold cavity, an actuator associated with each respective gate, each actuator being drivably interconnected to a valve pin drivable upstream and downstream along a path of travel having a selected stroke length that extends between a gate closed position, a selected maximum flow position at which the injection fluid material flows at a maximum rate through the gate into the cavity and one or more selectable intermediate positions between the first position and the maximum flow position, each actuator being controllably drivable to position an interconnected valve pin at the first, one or more selectable intermediate and maximum flow positions over the course of an injection cycle, a downstream sensor that senses a selected downstream physical condition of the injection fluid material at a position within an associated mold cavity that is downstream of an associated gate, the downstream sensor generating a signal corresponding to the sensed values, an upstream sensor that senses a selected upstream physical condition of the injection fluid material at a position within an associated mold cavity that is upstream of the downstream position, the method comprising the steps of:

recording and selecting as a standard for a selected one of the gates, the amount of time elapsed between the time at which the upstream sensor associated with the selected one of the gates first senses the selected upstream condition of the injection fluid and the time at which the downstream sensor first senses the selected downstream condition of the injection fluid material flowing into the associated mold cavity of the selected one of the gates, performing one or more subsequent injection cycles and for each of the other gates sensing the selected upstream and downstream physical condition of the injection fluid material at the upstream and downstream positions with the upstream and downstream sensors associated with each of the other gates, and, recording the amount of time elapsed between the time at which the upstream sensor associated with each of the other gates first senses the selected upstream condition of the injection fluid and the time at which the downstream sensor associated with each of the other gates first senses the selected condition of the injection fluid material flowing into the associated cavities of each of the other gates, comparing the recorded amounts of time elapsed associated with each of the other gates with the standard amount of time elapsed that is associated with the selected one of the gates, adjusting position or velocity of the actuators or valve pins associated with each of the other gates during each subsequent injection cycle such that the amount of time elapsed between the time at which the upstream sensor first senses the selected upstream condition and the time at which the downstream sensor first senses the selected downstream condition of the injection fluid material approaches or matches the selected standard amount of elapsed time.

In such a method the steps of performing and adjusting can be carried out automatically by an algorithm executed by a controller interconnected to and controllably driving or adjusting the drive of the actuators.

In such a method, the step of recording and selecting can comprise recording and establishing a standard profile of position of the actuator or valve pin versus time for the selected one of the gates and the step of adjusting can comprise recording and adjusting the position or drive rate of the actuators or valve pins associated with the other gates to approach or match the standard profile of position versus time.

In another aspect of the invention there is provided an apparatus for performing an injection molding cycle in an injection molding apparatus, the apparatus comprising:

a manifold that receives an injection fluid material, the manifold having or communicating with a delivery channel that delivers the injection fluid mold material under an injection pressure to two or more gates each leading to an associated mold cavity, an actuator associated with each respective gate, each actuator being drivably interconnected to a valve pin drivable upstream and downstream along a path of travel having a selected stroke length that extends between a gate closed position, a selected maximum flow position at which the injection fluid material flows at a maximum rate through the gate into the cavity and one or more selectable intermediate positions between the first position and the maximum flow position, each actuator being controllably drivable to position an interconnected valve pin at the first, one or more selectable intermediate and maximum flow positions over the course of an injection cycle, each gate having a downstream sensor that senses a selected downstream condition of the injection fluid material at a position within each associated mold cavity that is downstream of each associated gate, the downstream sensor generating a response signal upon sensing the selected condition of the injection fluid material when the injection fluid material has flowed to the downstream position of the downstream sensor, each gate having an upstream sensor that senses a selected upstream condition of the injection fluid material at a position within each associated mold cavity that is upstream of the downstream position associated with each gate, the upstream sensor generating a response signal upon sensing the selected condition of the injection fluid material when the injection fluid material has flowed to the upstream position of the upstream sensor, a controller containing predetermined data representing as a standard for a selected one of the gates, the amount of time elapsed between the time at which the upstream sensor associated with the selected one of the gates first senses the selected upstream condition of the injection fluid material and the time at which the downstream sensor associated with the selected one of the gates first senses the selected downstream condition of the injection fluid material flowing into the associated mold cavity, the upstream and downstream sensors of each of the other gates other than the selected one of the gates each sensing the selected upstream and downstream conditions of the injection fluid material and sending response signals to the controller on performance of each successive injection cycle by the apparatus, the controller receiving the response signals from the sensors associated with each of the other gates on performance of each successive injection cycle performed by the apparatus and calculating the amount of time elapsed between the time at which the upstream sensor associated with each of the other gates first senses the selected upstream condition of the injection fluid material and the time at which the downstream sensor associated with the selected one of the gates first senses the selected downstream condition of the injection fluid material flowing into the associated mold cavity, the controller including instructions that compares the amount of standard elapsed time with the calculated amount of elapsed time associated with each of the other gates, the controller including instructions that adjust the velocity or position of each of the actuators associated with each of the other gates to drive the valve pins associated with each of the other gates at one or more velocities or to one or more positions during one or more successive injection cycles based on the compared amounts of time such that the amount of time elapsed between the time that the upstream sensors associated with the other gates first sense the selected upstream condition of the injection fluid material and the time that the downstream sensors associated with the other gates first sense the selected downstream condition approaches or matches the standard amount of elapsed time.

Such an apparatus may include position sensors that sense position of the actuator or valve pin associated with each of the gates, the controller including data representing a standard profile of position of the actuator or valve pin versus time during an injection cycle for the selected one of the gates, the controller including instructions that compares position versus time of the actuators or valve pins for each of the gates during one or more successive injection cycles with the standard profile and directs the position or velocity of the actuators or valve pins associated with the other gates during the course of the one or more successive injection cycles such that the position versus time of the actuators or valve pins associated with the other gates approaches or matches the standard profile.

In another aspect of the invention there is provided a method of performing an injection molding cycle in an injection molding apparatus comprised of:

a manifold that receives an injection fluid material, the manifold having or communicating with a delivery channel that delivers the injection fluid mold material under an injection pressure to two or more gates each leading to an associated mold cavity, an actuator associated with each respective gate, each actuator being drivably interconnected to a valve pin drivable upstream and downstream along a path of travel having a selected stroke length that extends between a gate closed position, a selected maximum flow position at which the injection fluid material flows at a maximum rate through the gate into the cavity and one or more selectable intermediate positions between the first position and the maximum flow position, each actuator being controllably drivable to position an interconnected valve pin at the first, one or more selectable intermediate and maximum flow positions over the course of an injection cycle, a downstream sensor that senses a selected downstream physical condition of the injection fluid material at a position within an associated mold cavity that is downstream of an associated gate, the downstream sensor generating a signal corresponding to the sensed values, an upstream sensor that senses a selected upstream physical condition of the injection fluid material at a position within an associated mold cavity that is upstream of the downstream position, the method comprising the steps of:

selecting as a standard for all of the gates, the amount of time elapsed between the time at which the upstream sensor associated with a gate first senses the selected upstream condition of the injection fluid and the time at which the downstream sensor first senses the selected downstream condition of the injection fluid material flowing into the associated mold cavity of a gate, performing one or more subsequent injection cycles and for each of the gates sensing the selected upstream and downstream physical condition of the injection fluid material at the upstream and downstream positions with the upstream and downstream sensors associated with each of the other gates, recording the amount of time elapsed between the time at which the upstream sensor associated with each of the gates first senses the selected upstream condition of the injection fluid and the time at which the downstream sensor associated with each of the gates first senses the selected condition of the injection fluid material flowing into the associated cavities of each of the gates, comparing the recorded amounts of time elapsed associated with each of the gates with the selected standard amount of time, adjusting position or velocity of the actuators or valve pins associated with each of the gates during each subsequent injection cycle such that the amount of time elapsed between the time at which the upstream sensor first senses the selected upstream condition and the time at which the downstream sensor first senses the selected downstream condition of the injection fluid material approaches or matches the selected standard amount of elapsed time.

In such a method the steps of performing and adjusting can be carried out automatically by an algorithm executed by a controller interconnected to and controllably driving or adjusting the drive of the actuators.

In such a method, the step of recording and selecting can comprise recording and establishing a standard profile of position of the actuator or valve pin versus time for the selected one of the gates and the step of adjusting can comprise recording and adjusting the position or drive rate of the actuators or valve pins associated with the other gates to approach or match the standard profile of position versus time.

In another aspect of the invention there is provided an apparatus for performing an injection molding cycle in an injection molding apparatus, the apparatus comprising:

a manifold that receives an injection fluid material, the manifold having or communicating with a delivery channel that delivers the injection fluid mold material under an injection pressure to two or more gates each leading to an associated mold cavity, an actuator associated with each respective gate, each actuator being drivably interconnected to a valve pin drivable upstream and downstream along a path of travel having a selected stroke length that extends between a gate closed position, a selected maximum flow position at which the injection fluid material flows at a maximum rate through the gate into the cavity and one or more selectable intermediate positions between the first position and the maximum flow position, each actuator being controllably drivable to position an interconnected valve pin at the first, one or more selectable intermediate and maximum flow positions over the course of an injection cycle, each gate having a downstream sensor that senses a selected downstream condition of the injection fluid material at a position within each associated mold cavity that is downstream of each associated gate, the downstream sensor generating a response signal upon sensing the selected condition of the injection fluid material when the injection fluid material has flowed to the downstream position of the downstream sensor, each gate having an upstream sensor that senses a selected upstream condition of the injection fluid material at a position within each associated mold cavity that is upstream of the downstream position associated with each gate, the upstream sensor generating a response signal upon sensing the selected condition of the injection fluid material when the injection fluid material has flowed to the upstream position of the upstream sensor, a controller containing predetermined data representing as a standard for each of the gates, the amount of time elapsed between the time at which the upstream sensor associated with a gate first senses the selected upstream condition of the injection fluid material and the time at which the downstream sensor associated with a gate first senses the selected downstream condition of the injection fluid material flowing into the associated mold cavity, the upstream and downstream sensors of each of the gates each sensing the selected upstream and downstream conditions of the injection fluid material and each sending response signals to the controller on performance of each successive injection cycle by the apparatus, the controller receiving the response signals from the sensors associated with each of the gates on performance of each successive injection cycle performed by the apparatus and calculating the amount of time elapsed between the time at which the upstream sensor associated with each of the gates first senses the selected upstream condition of the injection fluid material and the time at which the downstream sensor associated with each of the gates first senses the selected downstream condition of the injection fluid material flowing into the associated mold cavity, the controller including instructions that compares the standard amount of elapsed time with the calculated amount of elapsed time associated with each of the gates, the controller including instructions that adjust the velocity or position of each of the actuators associated with each of the gates to drive the valve pins associated with each of the gates at one or more velocities or to one or more positions during one or more successive injection cycles based on the compared amounts of time such that the amount of time elapsed between the time that the upstream sensors associated with each of the gates first sense the selected upstream condition of the injection fluid material and the time that the downstream sensors associated with each of the gates first sense the selected downstream condition approaches or matches the standard amount of elapsed time.

Such an apparatus may include position sensors that sense position of the actuator or valve pin associated with each of the gates, the controller including data representing a standard profile of position of the actuator or valve pin versus time during an injection cycle for the gates, the controller including instructions that compares position versus time of the actuators or valve pins for each of the gates during one or more successive injection cycles with the standard profile and directs the position or velocity of the actuators or valve pins associated with each of the gates during the course of the one or more successive injection cycles such that the position versus time of the actuators or valve pins associated with each of the gates approaches or matches the standard profile.

In accordance with the invention therefore there is provided a method of performing an injection molding cycle in an injection molding apparatus comprised of:

a manifold that receives an injection fluid material, the manifold having or communicating with a delivery channel that delivers the injection fluid mold material under an injection pressure to two or more gates each leading to an associated mold cavity, an actuator associated with each respective gate, each actuator being drivably interconnected to a valve pin drivable upstream and downstream along a path of travel having a selected stroke length that extends between a gate closed position, a selected maximum flow position at which the injection fluid material flows at a maximum rate through the gate into the cavity and one or more selectable intermediate positions between the first position and the maximum flow position, each actuator being controllably drivable to position an interconnected valve pin at the first, one or more selectable intermediate and maximum flow positions over the course of an injection cycle, a downstream sensor that senses a selected physical condition of the injection fluid material at a position within a mold cavity that is downstream of an associated gate, the downstream sensor generating a signal corresponding to the sensed values, the method comprising the steps of:

selecting as a standard for each of the gates, the amount of time elapsed between movement of the valve pin associated with the selected one of the gates out of the gate closed position and the time at which the downstream sensor first senses the selected condition of the injection fluid material flowing into the associated mold cavity, performing a subsequent injection cycle and, for each of the gates, sensing the selected physical condition of the injection fluid material at the downstream position with the downstream sensor associated with each of the gates, and, recording the amount of time elapsed between movement of the valve pin associated with each of the gates out of the gate closed position and the time at which the downstream sensor first senses the selected condition of the injection fluid material flowing into the associated cavities of each of the gates, comparing the recorded amounts of time elapsed associated with each of the gates with the standard amount of time elapsed for one or more subsequent injection cycles, adjusting position or velocity of the actuators or valve pins associated with each of the gates during one or more subsequent injection cycles such that the amount of time elapsed between movement of the valve pins associated with each of the other gates of their gate closed position and the time at which the downstream sensor first senses the selected condition of the injection fluid material approaches or matches the selected standard amount of elapsed time.

In such a method the steps of performing and adjusting can be carried out automatically by an algorithm executed by a controller interconnected to and controllably driving or adjusting the drive of the actuators.

In such a method, the step of selecting and recording can comprise recording and establishing a standard profile of position of the actuator or valve pin versus time for the selected one of the gates and the step of adjusting can comprise recording and adjusting the position or drive rate of the actuators or valve pins associated with the other gates to approach or match the standard profile of position versus time.

In another aspect of the invention there is provided an apparatus for performing an injection molding cycle in an injection molding apparatus, the apparatus comprising:

a manifold that receives an injection fluid material, the manifold having or communicating with a delivery channel that delivers the injection fluid mold material under an injection pressure to two or more gates each leading to an associated mold cavity, an actuator associated with each respective gate, each actuator being drivably interconnected to a valve pin drivable upstream and downstream along a path of travel having a selected stroke length that extends between a gate closed position, a selected maximum flow position at which the injection fluid material flows at a maximum rate through the gate into the cavity and one or more selectable intermediate positions between the first position and the maximum flow position, each actuator being controllably drivable to position an interconnected valve pin at the first, one or more selectable intermediate and maximum flow positions over the course of an injection cycle, each gate having a downstream sensor that senses a selected condition of the injection fluid material at a position within each associated mold cavity that is downstream of each associated gate, the downstream sensor generating a response signal upon sensing the selected condition of the injection fluid material when the injection fluid material has flowed to the downstream position of the downstream sensor, a controller containing predetermined data representing as a standard for all gates, the amount of time elapsed between movement of the valve pin associated with a gate out of the gate closed position and the time at which the downstream sensor associated with a gate first senses the selected condition of the injection fluid material flowing into the associated mold cavity, the downstream sensors of each of the gates sensing the selected condition of the injection fluid material and sending response signals to the controller on performance of each successive injection cycle by the apparatus, the controller receiving the response signals from each downstream sensor associated with each of the gates on performance of each successive injection cycle performed by the apparatus, the controller including instructions that compares the amount of standard elapsed time with the calculated amount of elapsed time associated with each of the gates, the controller including instructions that adjust the velocity or position of each of the actuators associated with each of the gates to drive the valve pins associated with each of the gates at one or more velocities or to one or more positions during one or more successive injection cycles based on the compared amounts of time such that the amount of time elapsed between movement of the valve pins out of the gate closed position and the time that the downstream sensors associated with each of the gates first sense the selected condition approaches or matches the standard amount of elapsed time.

Such an apparatus may include position sensors that sense position of the actuator or valve pin associated with each of the gates, the controller including data representing a standard profile of position of the actuator or valve pin versus time during an injection cycle for the selected one of the gates, the controller including instructions that compares position versus time of the actuators or valve pins for each of the gates during one or more successive injection cycles with the standard profile and directs the position or velocity of the actuators or valve pins associated with the other gates during the course of the one or more successive injection cycles such that the position versus time of the actuators or valve pins associated with the other gates approaches or matches the standard profile.

In all of the foregoing aspects and embodiments, the cavities associated with each of the individual two or more gates may comprise separate individual cavities. Or alternatively the individual two or more gates may enter into a single cavity.

For purposes of explanation, as an example, where two (2) sensors are used in the cavity, the downstream sensor (namely downstream of the gate) can be a temperature sensor having a user defined sensing trigger of 250 F, with the upstream sensor (located near the entrance of the gate into the cavity) comprising a pressure sensor having a user defined sensing trigger of 5000 psi. Taking for example an embodiment where there are sixteen (16) gates with associated nozzles and each gate and nozzle feeding a separate mold cavity, the user can select and pre-define the part that is produced in a selected one of the sixteen (16) mold cavities as the preferred standard part based on trial and error observation or testing and next input data into a controller that represents the preferred standard amount of time elapsed between the triggering of the upstream and downstream sensors that are associated with the cavity that produced the preferred selected part thus establishing a standard amount of elapsed time that all of the other fifteen (15) gates should ideally approach or match on all subsequent injection cycles. The controller can then look at the time that elapsed between triggering of the upstream and downstream sensors for each of the sixteen (16) gates during the previous injection cycles and automatically adjust the speed of the actuators or valve pins to be faster or slower for the next shot in an effort to approach or match the standard elapsed time. On each additional subsequent cycles, the controller will look at the elapsed times for each gate again, and make adjustments to the speed or positioning of the actuators and valve pins for all gates in each subsequent injection cycle until the elapsed times between sensing by the upstream and downstream sensors for all gates approach or are equal to the standard elapsed time.

Taking another example where only a single downstream sensor is used in the cavity, the downstream sensor can be, for example, a temperature sensor having a user defined sensing trigger of 250 F. Assuming there are sixteen (16) gates and associated nozzles with each gate and nozzle injecting into a separate mold cavity, the user can define the conditions used to inject into a selected one of the cavities as the standard and select and establish the time elapsed between opening of the gate and triggering of the downstream sensor as the standard elapsed time. The controller can then record the analogous elapsed time that occurred during the previous shot for all sixteen (16) gates and adjusts the actuator or valve pin speeds associated with each gate to be faster or slower for the next shot in an effort to approach or match the selected standard elapsed time. For all subsequent cycles, the controller can be programmed to continue to record the elapsed times for each previous cycle or shot, and make adjustments for each subsequent cycle until the analogous elapsed times between valve pin opening and downstream sensor triggering for all gates are equal to the standard elapsed time.

In either of the aforementioned examples, the user could alternatively simply select and specify a predetermined elapsed time without testing or analyzing parts produced by the cavities.

BRIEF DESCRIPTION OF THE DRAWINGS

The above and further advantages of the invention may be better understood by referring to the following description in conjunction with the accompanying drawings in which.

DETAILED DESCRIPTION

Figure 1:
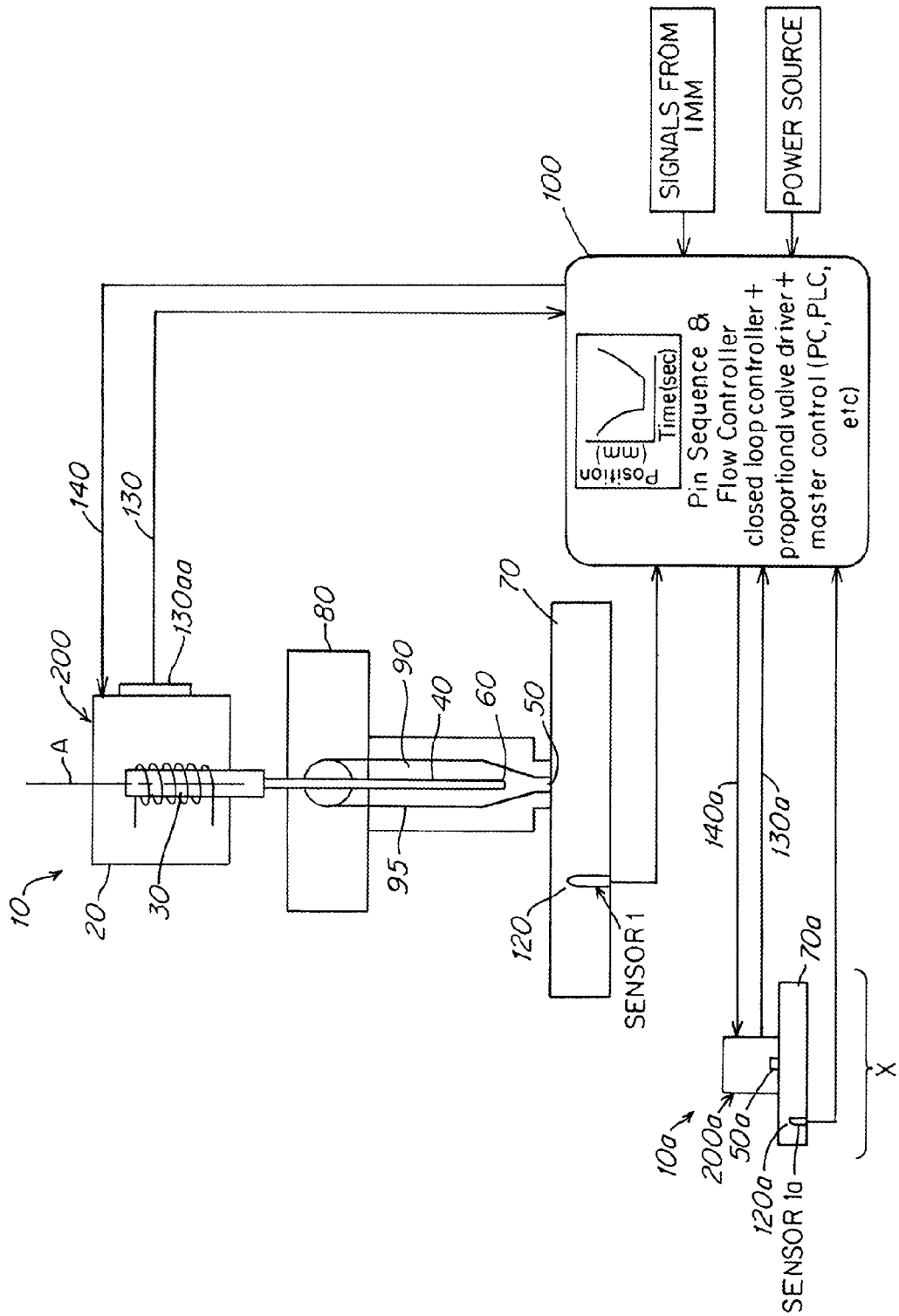
FIG. 1 is a schematic of an embodiment of the invention showing an electrically powered actuator interconnected to a valve pin that controls flow through a gate into a mold cavity having a single sensor disposed for detecting injection material downstream of the gate.

FIG. 1 shows a system 10 according to the invention comprised of multiple injection valve assemblies 200, 200a each of which comprise an electrically powered actuator 20 having an electric motor rotor 30 that is interconnected to a valve pin 40 that is controllably driven back and forth along an axis A at controlled velocities by controller 100 that contains a programmable processor and interconnected memory that can execute instructions using data input by the user. The valve pin 40 for each valve assembly has a distal tip end 60 that opens and closes a separate gate 50 for each valve assembly and, depending on the precise positioning of the tip end 60 relative to the interior surface of the nozzle that forms the gate 60, regulates the rate of flow of injection fluid material 90 injected from manifold 80 into nozzle passage 95 and ultimately through gate 50 into the mold cavity 70. Thus the controller 100 can, when appropriately programmed regulate the rate or velocity of flow of injection fluid material 90 into cavity 70 by regulating the velocity or positioning of valve pin 65 and its tip end 60 during the course of an injection cycle particularly the withdrawal or upstream velocity of the pin at the beginning of the injection cycle.

One or more additional injection valve assemblies 200a each separately associated with a different gate to the same or different mold cavities can be interconnected to and controlled by controller 100. In the embodiment shown in FIGS. 1-4, each individual one of the assemblies 200, 200a inject into a separate mold cavity 70, 70a in which a separate part is formed. In the FIG. 1 embodiment, a single downstream sensor, Sensor 1, is shown positioned for detecting a selected condition of the injection fluid at a selected downstream position 120 within the cavity 70. Similarly, each of the other assemblies 200a have a downstream sensor 1a positioned for sensing a selected condition of injection fluid at a downstream position 120a within cavity 70a. The distance between the exit of gate 50 and downstream sensing position 120 is preselected and is the same or substantially the same as the distance between the downstream sensing position 120a and exit 50a of each of the other injection assemblies 200a. The assemblies 10, 10a can each include a position sensor 130a that sends a signal 130, 130a indicative of the axial A position of rotor 30 and/or valve pin 65 and tip end 60 of each assembly 10, 10a to the processor or memory of controller 100. The controller 100 includes memory and a program with instructions that store and use as a standard, the predetermined amount of time that it takes injection fluid to flow from gate 50 to the time of detection by Sensor 1 at position 120. The standard time is predetermined either by conducting one or more test cycles at various trial and error withdrawal speeds for pin 65 or profiles of pin 65 position using assembly 10. After conducting such trials and determining the formation of a part formed within cavity 70 that is ideal, the withdrawal speed or position profile of pin 65 for the most preferred part forming trial is selected as a standard. The standard elapsed time or position profile is input to controller 100. Alternatively, the user can simply select a standard elapsed time or pin position profile.

The controller 100 contains instructions that for one or more subsequent injection cycles of assemblies 200a, preferably all subsequent injection cycles, automatically records the time elapsed between the associated valve pins first opening gates 50a and the time that sensor 1a detects the injection fluid at position 120a of assemblies 200a. The controller then compares the automatically recorded elapsed times for assemblies 200a. If the compared recorded elapsed time for any assembly 200a differs from the established standard elapsed time, the controller 100 automatically adjusts the velocity or positioning of the valve pins associated with assemblies 200a to drive the actuators associated with such other assemblies to attempt to achieve a velocity or profile of position of movement of the actuators and valve pins of assemblies 200a that will cause the elapsed time for the assemblies 200a to approach or match the elapsed time for the standard.

As shown in FIGS. 1-4, there are one or more, typically multiple additional X injection assemblies in any given system.

The preselected condition of the fluid that the Sensor 1 typically senses is pressure or temperature.

Figure 2:
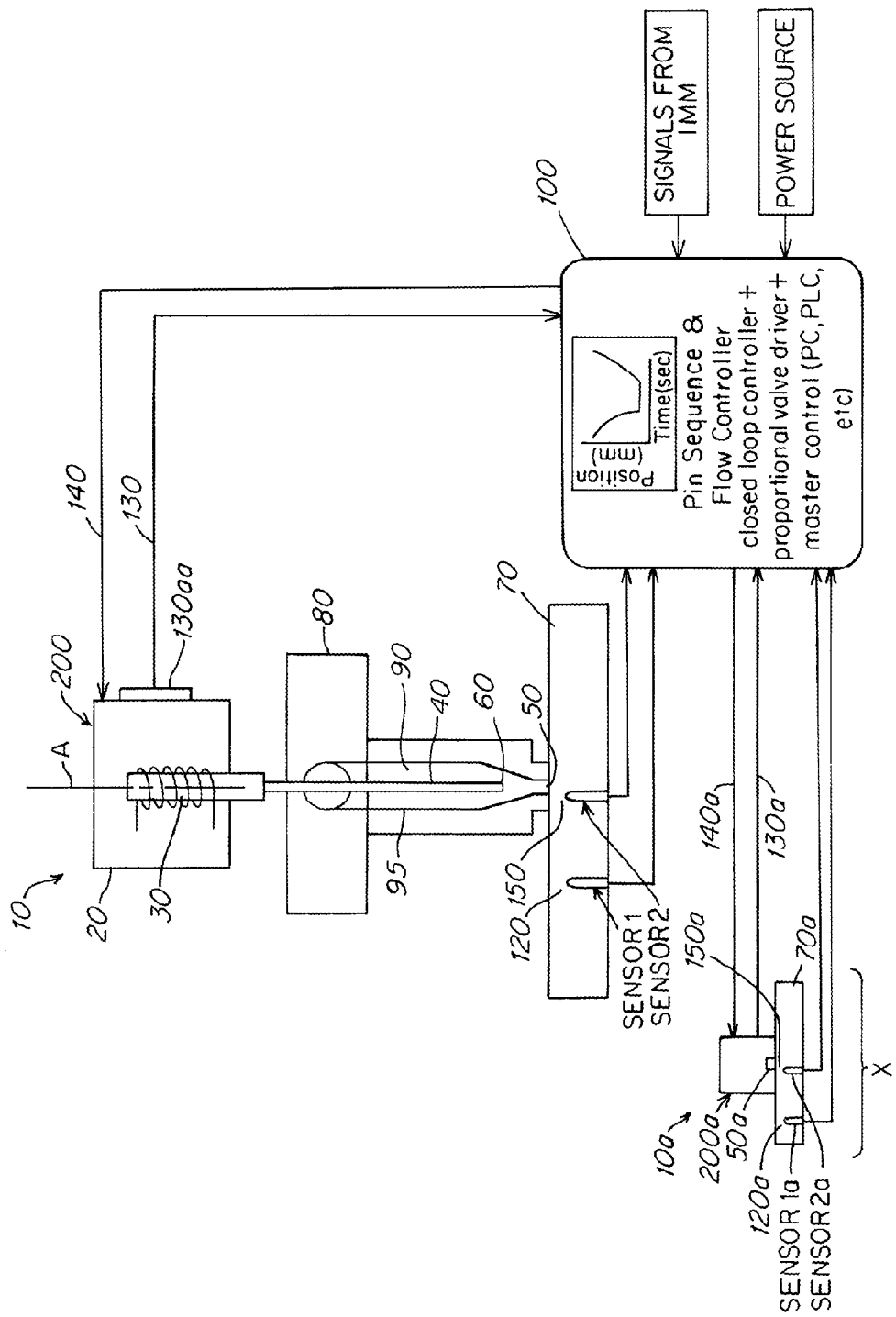
FIG. 2 is a schematic of an embodiment of the invention showing an electrically powered actuator interconnected to a valve pin that controls flow through a gate into a mold cavity having a first sensor disposed at the exit of the gate into a mold cavity and another sensor disposed downstream of the first sensor for detecting injection material downstream of the gate.

FIG. 2 shows a system 10 analogous to the system 10 of FIG. 1, the only difference being that the elapsed time on which the control system is based is the time elapsed between the time that an upstream sensor, Sensor 2 (or Sensor 2a) senses a preselected condition of the injection fluid at upstream point 150, 150a, and the time at which the downstream Sensor 1 senses the preselected condition of the injection fluid at point 120, 120a.

The preselected condition of the fluid that the Sensor 1 and Sensor 2 typically sense is pressure or temperature. Sensor 1 could sense one condition such as pressure and Sensor 2 could sense a different condition such as temperature or the same condition as Sensor 1.

Figure 3:
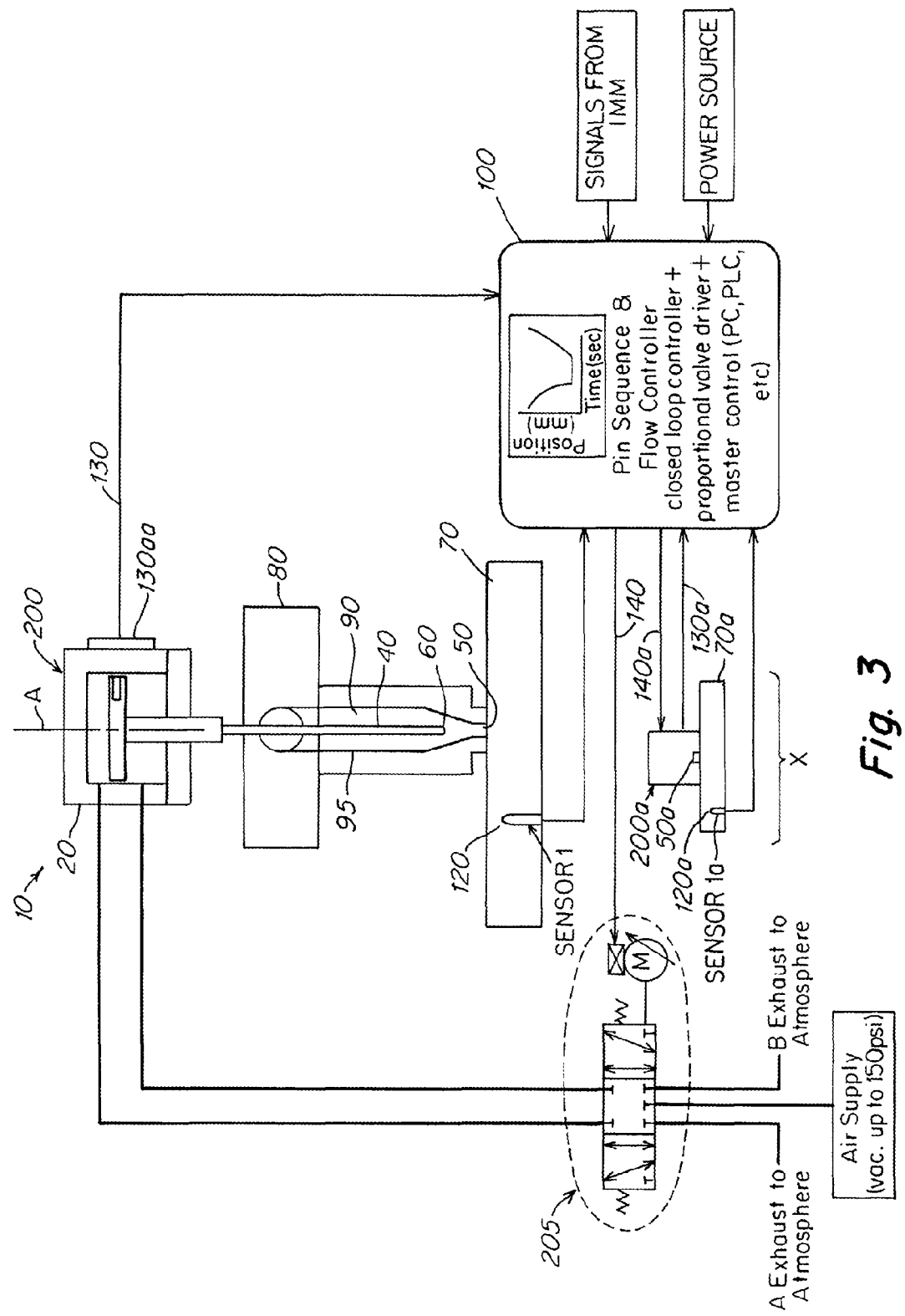
FIG. 3 is a schematic of an embodiment of the invention showing a pneumatically powered system injection molding system comprising a valve pin that controls flow through a gate into a mold cavity having a single sensor disposed for detecting injection material downstream of the gate, the valve pin having a distal tip end that is adapted to interact with the interior surface of the gate area of the apparatus to reduce injection fluid material flow to a reduced rate of flow that is less than the maximum rate of flow of the fluid material when the tip end is not in restriction proximity to the gate area, the valve pin being controllably driven by a remotely controllable, high precision flow control valve interconnected respectively between the flow ports of the upper and lower gas drive chambers of a pneumatic actuator and a master source of pressurized gas, typically air, that drives the system.
Figure 4:
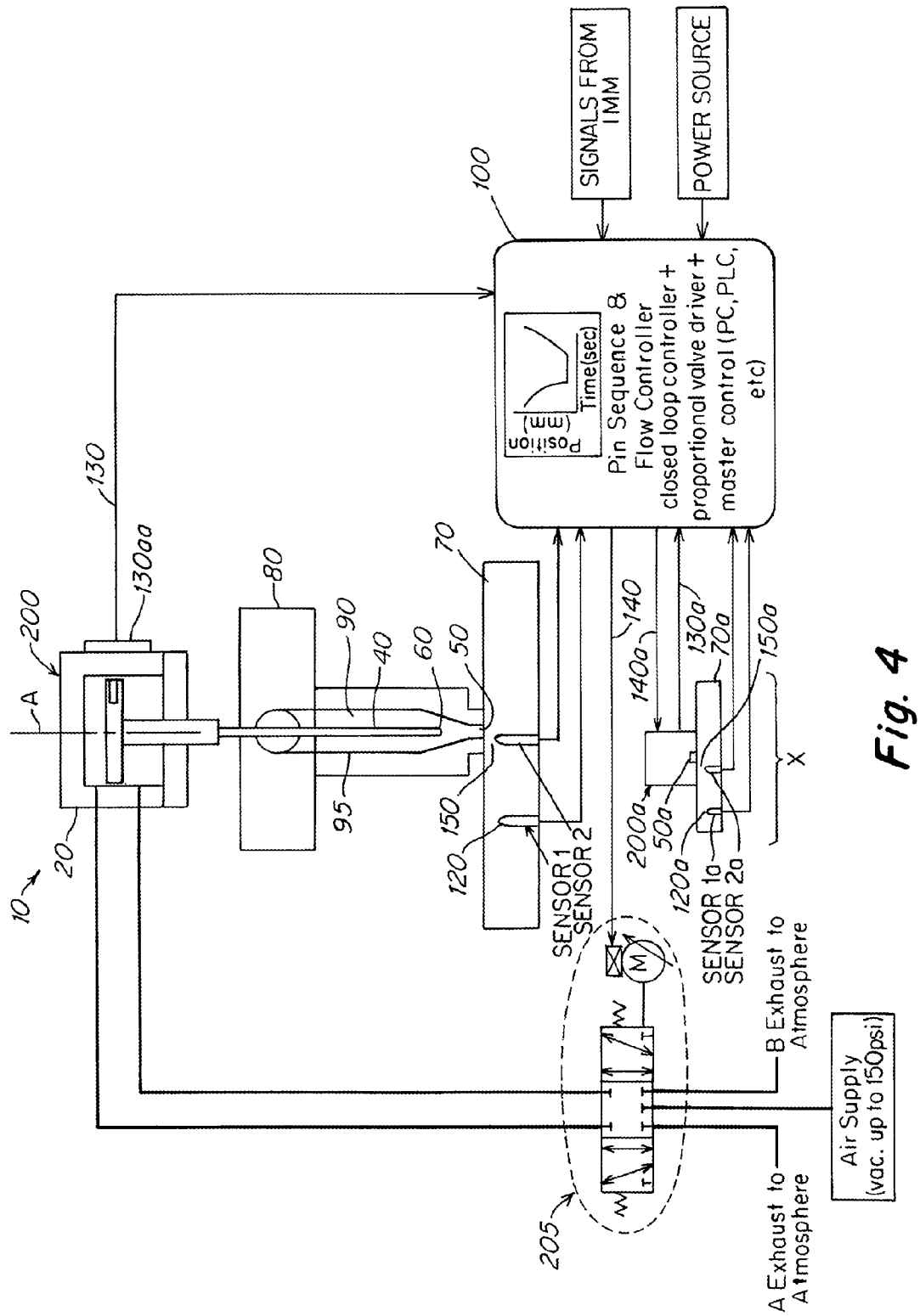
FIG. 4 is a schematic of an embodiment of the invention showing a pneumatically powered system injection molding system comprising a valve pin that controls flow through a gate into a mold cavity having a first sensor disposed at the exit of the gate into a mold cavity and another sensor disposed downstream of the first sensor for detecting injection material downstream of the gate, the valve pin having a distal tip end that is adapted to interact with the interior surface of the gate area of the apparatus to reduce injection fluid material flow to a reduced rate of flow that is less than the maximum rate of flow of the fluid material when the tip end is not in restriction proximity to the gate area, the valve pin being controllably driven by a remotely controllable, high precision flow control valve interconnected respectively between the flow ports of the upper and lower gas drive chambers of a pneumatic actuator and a master source of pressurized gas, typically air, that drives the system.

FIGS. 3 and 4 depict systems in which the actuation systems comprises a fluid driven, as opposed to an electricity driven, actuator 20. A preferred fluid driven valve system 205 comprises a fast acting linear force motor driven proportional valve 205 that regulates the flow of either gas or liquid to the actuator 20, namely either a pneumatic or hydraulic system.

The system 10 of FIG. 3 operates in the same manner as described with reference to FIG. 1, the difference being that the controller 100 controls the operation of the fluid control valve system 205 and the same or similar fluid control valve system that drives the injection system 200a.

The system of FIG. 4 operates in the same manner as described with reference to FIG. 2, the difference being that the controller controls the operation of the valve system 205 and the same or similar fluid control valve system that drives the injection system 200a.

A fast acting fluid control valve system as described in detail in PCT/US2014/31000 and in U.S. Pat. No. 5,960,831, the disclosures of both of which are incorporated herein by reference can be used in the apparatuses described herein particularly where pneumatic valve control systems are preferred for the particular application.

What is claimed is:

1. A method of performing an injection molding cycle in an injection molding apparatus comprised of:
 a manifold that receives an injection fluid material, the manifold having or communicating with a delivery channel that delivers the injection fluid mold material under an injection pressure to two or more gates each leading to an associated mold cavity,
 an actuator associated with each respective gate,
 each actuator being drivably interconnected to a valve pin drivable upstream and downstream along a path of travel having a selected stroke length that extends between a gate closed position, a selected maximum flow position at which the injection fluid material flows at a maximum rate through the gate into the cavity and one or more selectable intermediate positions between the first position and the maximum flow position,
 each actuator being controllably drivable to position an interconnected valve pin at the first, one or more selectable intermediate and maximum flow positions over the course of an injection cycle,
 a downstream sensor that senses a selected physical condition of the injection fluid material at a position within a mold cavity that is downstream of an associated gate, the downstream sensor generating a signal corresponding to the sensed values,
 the method comprising the steps of:
 selecting and recording as a standard for a selected one of the gates, the amount of time elapsed between movement of the valve pin associated with the selected one of the gates out of the gate closed position and the time at which the downstream sensor first senses the selected condition of the injection fluid material flowing into the associated mold cavity,
 performing a subsequent injection cycle and for each of the other gates and sensing the selected physical condition of the injection fluid material at the downstream position with the downstream sensor associated with each of the other gates, and,
 recording the amount of time elapsed between movement of the valve pin associated with each of the other gates out of the gate closed position and the time at which the downstream sensor first senses the selected condition of the injection fluid material flowing into the associated cavities of each of the other gates,
 comparing the recorded amounts of time elapsed associated with each of the other gates with the standard amount of time elapsed that is associated with the selected one of the gates,
 adjusting position or velocity of the actuators or valve pins associated with each of the other gates during further subsequent injection cycles such that the amount of time elapsed between movement of the valve pins associated with each of the other gates of their gate closed position and the time at which the downstream sensor first senses the selected condition of the injection fluid material approaches or matches the selected standard amount of elapsed time,
 wherein the step of selecting and recording comprises recording and establishing a standard profile of position of the actuator or valve pin versus time for the selected one of the gates and the step of adjusting can comprise recording and adjusting the position or drive rate of the actuators or valve pins associated with the other gates to approach or match the standard profile of position versus time.

2. The method of claim 1 wherein the steps of performing and adjusting are carried out automatically by an algorithm executed by a controller interconnected to and controllably driving or adjusting the drive of the actuators.

3. Apparatus for performing an injection molding cycle in an injection molding apparatus, the apparatus comprising:
 a manifold that receives an injection fluid material, the manifold having or communicating with a delivery channel that delivers the injection fluid mold material under an injection pressure to two or more gates each leading to an associated mold cavity,
 an actuator associated with each respective gate,
 each actuator being drivably interconnected to a valve pin drivable upstream and downstream along a path of travel having a selected stroke length that extends between a gate closed position, a selected maximum flow position at which the injection fluid material flows at a maximum rate through the gate into the cavity and one or more selectable intermediate positions between the first position and the maximum flow position,
 each actuator being controllably drivable to position an interconnected valve pin at the first, one or more selectable intermediate and maximum flow positions over the course of an injection cycle,
 each gate having a downstream sensor that senses a selected condition of the injection fluid material at a position within each associated mold cavity that is downstream of each associated gate, the downstream sensor generating a response signal upon sensing the selected condition of the injection fluid material when the injection fluid material has flowed to the downstream position of the downstream sensor,
 a controller containing predetermined data representing as a standard for a selected one of the gates, the amount of time elapsed between movement of the valve pin associated with the selected one of the gates out of the gate closed position and the time at which the downstream sensor associated with the selected one of the gates first senses the selected condition of the injection fluid material flowing into the associated mold cavity,
 the downstream sensors of each of the gates other than the selected one of the gates sensing the selected condition of the injection fluid material and sending response signals to the controller on performance of each successive injection cycle by the apparatus,
 the controller receiving the response signals from each downstream sensor associated with the other gates on performance of each successive injection cycle performed by the apparatus,
 the controller including instructions that compares the amount of standard elapsed time with the calculated amount of elapsed time associated with each of the other gates, the controller including instructions that adjust the velocity or position of each of the actuators associated with each of the other gates to drive the valve pins associated with each of the other gates at one or more velocities or to one or more positions during one or more successive injection cycles based on the compared amounts of time such that the amount of time elapsed between movement of the valve pins out of the gate closed position and the time that the downstream sensors associated with the other gates first sense the selected condition approaches or matches the standard amount of elapsed time, and position sensors that sense position of the actuator or valve pin associated with each of the gates, the controller including data representing a standard profile of position of the actuator or valve pin versus time during an injection cycle for the selected one of the gates, the controller including instructions that compares position versus time of the actuators or valve pins for each of the gates during one or more successive injection cycles with the standard profile and directs the position or velocity of the actuators or valve pins associated with the other gates during the course of the one or more successive injection cycles such that the position versus time of the actuators or valve pins associated with the other gates approaches or matches the standard profile.

4. A method of performing an injection molding cycle in an injection molding apparatus comprised of:
 a manifold that receives an injection fluid material, the manifold having or communicating with a delivery channel that delivers the injection fluid mold material under an injection pressure to two or more gates each leading to an associated mold cavity,
 an actuator associated with each respective gate,
 each actuator being drivably interconnected to a valve pin drivable upstream and downstream along a path of travel having a selected stroke length that extends between a gate closed position, a selected maximum flow position at which the injection fluid material flows at a maximum rate through the gate into the cavity and one or more selectable intermediate positions between the first position and the maximum flow position,
 each actuator being controllably drivable to position an interconnected valve pin at the first, one or more selectable intermediate and maximum flow positions over the course of an injection cycle,
 a downstream sensor that senses a selected physical condition of the injection fluid material at a position within a mold cavity that is downstream of an associated gate, the downstream sensor generating a signal corresponding to the sensed values,
 the method comprising the steps of:
 selecting as a standard for each of the gates, the amount of time elapsed between movement of the valve pin associated with the selected one of the gates out of the gate closed position and the time at which the downstream sensor first senses the selected condition of the injection fluid material flowing into the associated mold cavity,
 performing a subsequent injection cycle and, for each of the gates, sensing the selected physical condition of the injection fluid material at the downstream position with the downstream sensor associated with each of the gates, and,
 recording the amount of time elapsed between movement of the valve pin associated with each of the gates out of the gate closed position and the time at which the downstream sensor first senses the selected condition of the injection fluid material flowing into the associated cavities of each of the gates,
 comparing the recorded amounts of time elapsed associated with each of the gates with the standard amount of time elapsed for one or more subsequent injection cycles,
 adjusting position or velocity of the actuators or valve pins associated with each of the gates during one or more subsequent injection cycles such that the amount of time elapsed between movement of the valve pins associated with each of the other gates of their gate closed position and the time at which the downstream sensor first senses the selected condition of the injection fluid material approaches or matches the selected standard amount of elapsed time,
 wherein the step of selecting and recording comprises recording and establishing a standard profile of position of the actuator or valve pin versus time for the selected one of the gates and the step of adjusting can comprise recording and adjusting the position or drive rate of the actuators or valve pins associated with the other gates to approach or match the standard profile of position versus time.

5. The method of claim 4 wherein the steps of performing and adjusting are carried out automatically by an algorithm executed by a controller interconnected to and controllably driving or adjusting the drive of the actuators.

6. An apparatus for performing an injection molding cycle in an injection molding apparatus, the apparatus comprising:
 a manifold that receives an injection fluid material, the manifold having or communicating with a delivery channel that delivers the injection fluid mold material under an injection pressure to two or more gates each leading to an associated mold cavity,
 an actuator associated with each respective gate,
 each actuator being drivably interconnected to a valve pin drivable upstream and downstream along a path of travel having a selected stroke length that extends between a gate closed position, a selected maximum flow position at which the injection fluid material flows at a maximum rate through the gate into the cavity and one or more selectable intermediate positions between the first position and the maximum flow position,
 each actuator being controllably drivable to position an interconnected valve pin at the first, one or more selectable intermediate and maximum flow positions over the course of an injection cycle,
 each gate having a downstream sensor that senses a selected condition of the injection fluid material at a position within each associated mold cavity that is downstream of each associated gate, the downstream sensor generating a response signal upon sensing the selected condition of the injection fluid material when the injection fluid material has flowed to the downstream position of the downstream sensor,
 a controller containing predetermined data representing as a standard for all gates, the amount of time elapsed between movement of the valve pin associated with a gate out of the gate closed position and the time at which the downstream sensor associated with a gate first senses the selected condition of the injection fluid material flowing into the associated mold cavity,
 the downstream sensors of each of the gates sensing the selected condition of the injection fluid material and sending response signals to the controller on performance of each successive injection cycle by the apparatus, the controller receiving the response signals from each downstream sensor associated with each of the gates on performance of each successive injection cycle performed by the apparatus, the controller including instructions that compares the amount of standard elapsed time with the calculated amount of elapsed time associated with each of the gates, the controller including instructions that adjust the velocity or position of each of the actuators associated with each of the gates to drive the valve pins associated with each of the gates at one or more velocities or to one or more positions during one or more successive injection cycles based on the compared amounts of time such that the amount of time elapsed between movement of the valve pins out of the gate closed position and the time that the downstream sensors associated with each of the gates first sense the selected condition approaches or matches the standard amount of elapsed time, and position sensors that sense position of the actuator or valve pin associated with each of the gates, the controller including data representing a standard profile of position of the actuator or valve pin versus time during an injection cycle for the selected one of the gates, the controller including instructions that compares position versus time of the actuators or valve pins for each of the gates during one or more successive injection cycles with the standard profile and directs the position or velocity of the actuators or valve pins associated with the other gates during the course of the one or more successive injection cycles such that the position versus time of the actuators or valve pins associated with the other gates approaches or matches the standard profile.

7. The apparatus of claim 6 wherein corresponding cavities are associated with each of the individual two or more gates the cavities comprising either separate individual cavities or wherein two or more gates enter into a single cavity.

\* \* \* \* \*